United States Patent [19]

Le Deit

[11] Patent Number: 5,226,510
[45] Date of Patent: Jul. 13, 1993

[54] DISC BRAKE WITH SLIDABLE CALIPER

[75] Inventor: Gérard Le Deit, Drancy, France

[73] Assignee: Bendix Europe Services Techniques, Drancy, France

[21] Appl. No.: 918,923

[22] Filed: Jul. 22, 1992

Related U.S. Application Data

[63] Continuation of Ser. No. 758,376, Sep. 3, 1991, abandoned, which is a continuation of Ser. No. 512,713, Apr. 23, 1990, abandoned.

[30] Foreign Application Priority Data

Apr. 28, 1989 [FR] France ..................... 89 05660

[51] Int. Cl.⁵ .............................................. F16D 65/09
[52] U.S. Cl. ............................. 188/73.34; 188/73.44; 188/73.45
[58] Field of Search ............... 188/73.45, 73.42, 73.43, 188/73.44, 73.34

[56] References Cited

U.S. PATENT DOCUMENTS

| | | | |
|---|---|---|---|
| 4,042,074 | 8/1977 | Ishihara | 188/73.45 |
| 4,072,217 | 2/1978 | Inoue et al. | 188/73.34 |
| 4,267,904 | 5/1981 | Belart | 188/73.45 |
| 4,334,599 | 6/1982 | Ritsema et al. | 188/73.45 |
| 4,347,917 | 9/1982 | Kita | 188/73.45 |
| 4,427,096 | 1/1984 | Stoka et al. | 188/73.45 X |
| 4,781,273 | 11/1988 | Fujinami | 188/73.45 X |

FOREIGN PATENT DOCUMENTS

| | | | |
|---|---|---|---|
| 2705788 | 8/1977 | Fed. Rep. of Germany | 188/73.45 |
| 2329901 | 5/1977 | France | |
| 2330916 | 6/1977 | France | |
| 2373720 | 7/1977 | France | |
| 2423680 | 11/1979 | France | |
| 224530 | 9/1989 | Japan | 188/73.45 |

*Primary Examiner*—George E. A. Halvosa
*Attorney, Agent, or Firm*—Larry J. Palguta; Ken C. Decker

[57] ABSTRACT

The invention relates to a disc-brake with a caliper (2) slidably mounted on a stationary support (1), comprising two friction pads, (4, 5) anchorably and slidably received in the stationary support (1) and capable of frictionally engaging with the opposite faces of a revolving disc (3) upon application of a brake (8), an axial column (10), integral with the stationary support (1) and slidably received in a corresponding bore (11) formed in the caliper (2), and a mechanism (20) for locking the caliper (2) in rotation about the column (10) on the stationary support (1). The mechanism (20) for locking the caliper (2) on the stationary support (1) is of the ball joint type so as to permit a disalignment of the caliper (2) with respect to the stationary support (1) upon actuation of the brake motor (8).

6 Claims, 2 Drawing Sheets

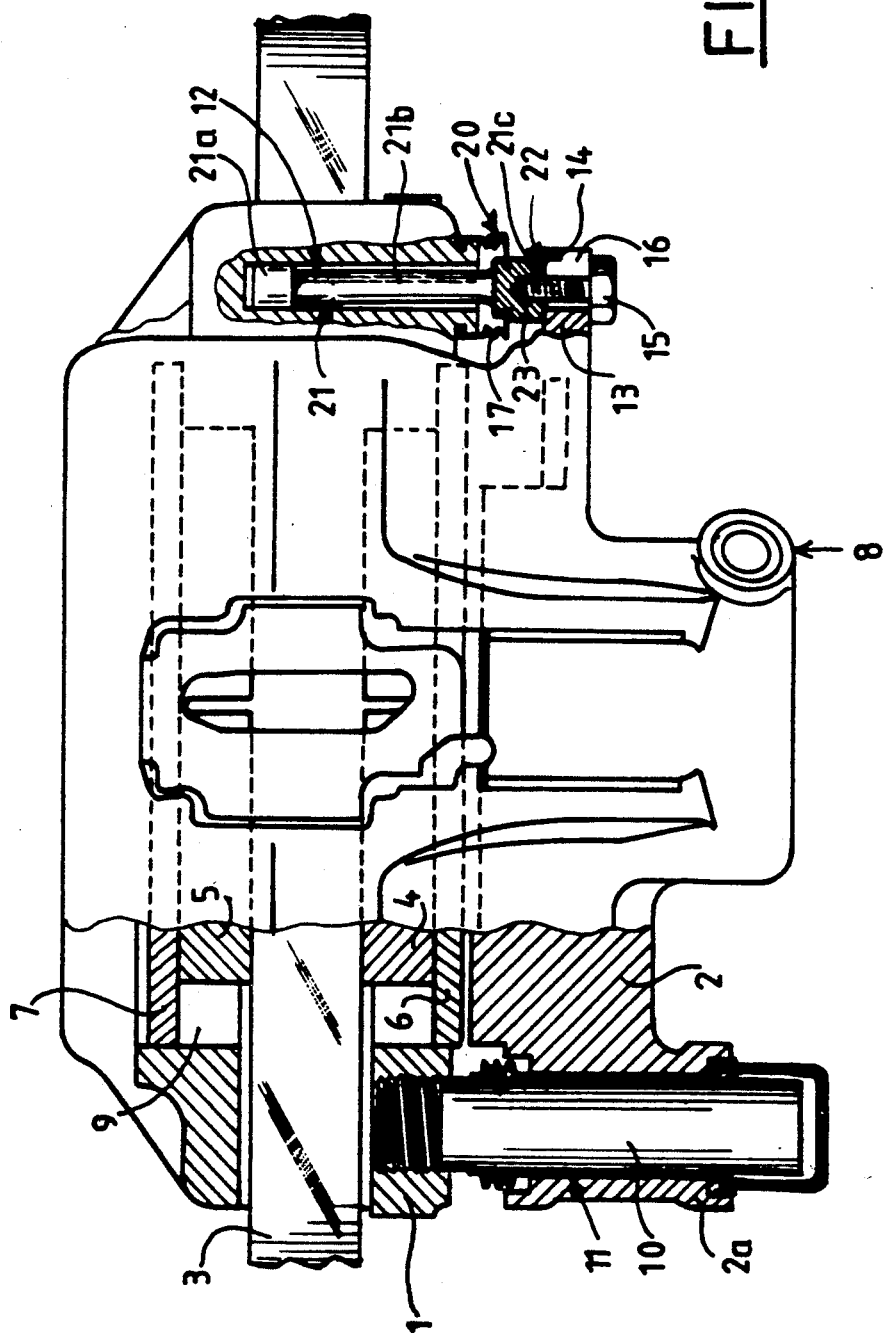

DISC BRAKE WITH SLIDABLE CALIPER

This is a continuation of abandoned application Ser. No. 07/758,376 filed Sep. 3, 1991 which is a continuation of abandoned application Ser. No. 07/512,713 filed Apr. 23, 1990.

BACKGROUND OF THE INVENTION

The invention relates to a disc-brake with a slidable caliper, in particular for a motor vehicle.

The invention relates in particular to a disc-brake, the caliper of which is slidably mounted, by means of an axial column, on a stationary support in which two friction pads are anchorably and slidably received and are capable of frictionally engaging with the opposite faces of a revolving disc upon activation of a brake motor acting directly on one of the friction pads and acting on the other friction pad by reaction across the slidable caliper.

In a known manner, in this type of disc-brake the caliper is generally held in position on the stationary support, during assembly of the brake, either with the aid of a pin passing through bore holes formed in lugs integral with the stationary support and through an opening formed in an extension of the caliper, or with the aid of a second axial column joined to the stationary support by a threaded connection.

However, these various types of locking may hinder, during actuation of the brake motor, a longitudinal sliding of the caliper, given that a torsion of the caliper occurs, or produce bruising of the locking member or of the parts of the caliper which are brought into contact with the parts of the stationary support.

SUMMARY OF THE INVENTION

The invention relates to a disc-brake of the type described above in which such a disadvantage is overcome.

To this end, the invention provides a disc-brake with a caliper slidably mounted on a stationary support, comprising two friction pads anchorably and slidably received in the stationary support and capable of frictionally engaging with the opposite faces of a revolving disc upon actuation of a brake motor, an axial column integral with the stationary support and slidably received in a corresponding bore formed in the caliper, and a means for locking the caliper in rotation about the column on the stationary support; the means for locking the caliper on the stationary support is of the ball joint type so as to permit a disalignment of the caliper with respect to the stationary support upon actuation of the brake motor.

According to further features of the invention:

the ball joint type locking means consists of a pin extending axially between a bore provided in the stationary support and an arm of the caliper and comprising, at its end penetrating the bore of the stationary support, a small bearing surface, the small bearing surface of the pin is cylindrical, the small bearing surface of the pin is spherical, the small bearing surface of the pin is oval, the pin comprises, at its end opposite the small bearing surface, a shoulder forming a plane stop surface perpendicular to the axis of the pin and intended to come to bear on a planar part of the arm of the caliper, said stop surface containing a threaded hole intended to cooperate with an immobilizing member passing, with clearance, through an opening provided in the caliper so as to permit an axial centering of said pin during assembly of the brake.

BRIEF DESCRIPTION OF THE DRAWINGS

The invention will be described in greater detail below with reference to the accompanying drawings, given merely by way of example, in which:

FIG. 1 is a plan view, partially in section, of a disc-brake constructed according to the invention.

DETAILED DESCRIPTION OF THE INVENTION

Figure 4:
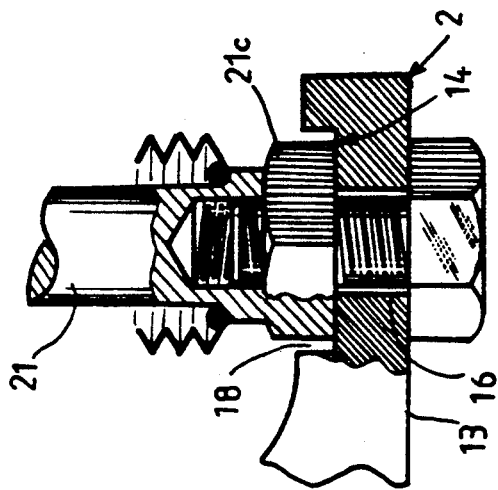
FIG. 4 is a partial view, in section, of a variant of the member for immobilizing the locking pin.

With reference first of all to FIG. 1, it can be seen that the disc-brake comprises a support 1 intended to be joined to a stationary part of the vehicle (not shown). The stationary support 1 slidably receives a movable caliper 2 which straddles a disc 3 intended to be joined in rotation to one wheel of the vehicle.

The disc-brake additionally comprises two friction pads 4 and 5 fitted with support plates 6 and 7, respectively, and capable of frictionally engaging with the revolving disc 3, upon actuation of a hydraulic brake motor 8. The friction pads 4 and 5 are anchorably and slidably received in an opening 9 formed in the stationary support 1.

The caliper 2 slides on the stationary support 1 by means of an axial column 10, the axis of which is substantially parallel to the axis of the disc 3. The column 10 is integral with the stationary support 1 and is slidably received in a corresponding bore 11 formed in an arm 2a of the caliper 2.

The disc-brake also comprises a means, designated as a whole by the reference 20, for locking the caliper 2 on the stationary support 1, which means opposes the tilting of the caliper about the axis of the column 10.

The locking means 20 is of the ball joint type and, to this effect, consists of a pin 21, the axis of which, at rest, is substantially parallel to the axis of the disc 3. This pin 21 extends axially between a bore 12 provided in the stationary support 1 and an arm 13 of the caliper 2 and comprises, at its end penetrating the bore 12, a small bearing surface 21a supported by a stem part 21b of small diameter over the entire length accommodated in the bore 12 so as to form a clearance between this stem part 21b and said bore. The stem of the pin 21 is relatively flexible and its diameter outside the bearing surface 21a is less than the latter in order to permit the disalignment.

The small bearing surface 21a thus constitutes a ball joint in the bore 12 and may be either a cylindrical bearing surface 21a (FIG. 1) or a spherical bearing surface.

The length of the small bearing surface 21a is sufficiently short to permit the swivel effect despite the very small clearance between the bore 12 and the diameter of this bearing surface 21a, given that said bearing surface may be cylindrical.

Figure 3:
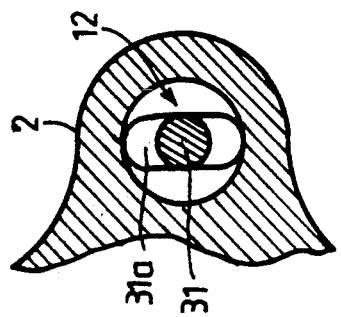
FIG. 3 is a view, in partial section, along the line 3—3 of FIG. 2.
Figure 2:
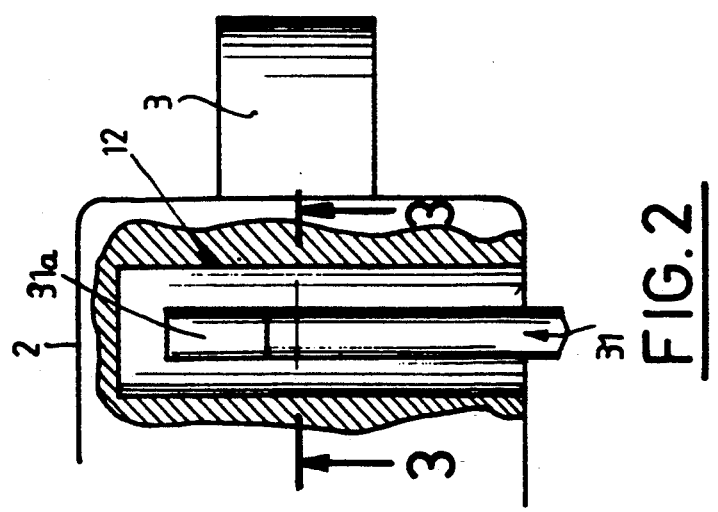
FIG. 2 is a partial view, in section, of a variant of the small bearing surface of the pin for locking the caliper on the stationary support.

According to a variant shown in FIGS. 2 and 3, the pin 31 comprises, at its end penetrating the bore 12, a small oval bearing surface 31a. This arrangement makes it possible to obtain a localized contact between the bearing surface 31a and the bore 12 and a preferential locking in the vertical direction while allowing a certain freedom in the horizontal direction.

The pin 21 comprises, at its end opposite the small bearing surface 21a, a shoulder 21c forming a planar stop surface 22 perpendicular to the axis of the pin and intended to come to bear on a planar part 14 of an arm 13 of the caliper 2.

The stop surface 22 contains a threaded hole 23 intended to cooperate with an immobilizing member 15, consisting for example of a screw, which passes, with clearance through an opening 16 formed in the arm 13 of the caliper. This opening 16 has for example the form of a slot.

A sealing bellows 17 extends between the shoulder 21c of the pin 21 and the stationary support 1.

The mounting of the caliper 2 on the stationary support 1 is carried out in the following manner.

The column 10 is already screwed onto the stationary support 1, and the caliper 2, in the tilted position, is mounted on said column. The pin 21 is introduced into the bore 12.

The caliper 2 is then tilted about the axis of the column 10 until it is possible to screw the screw 15 into the threaded hole 23 in the pin 21 through the opening 16.

As the screw 15 is screwed in, the stop surface 22 of the pin 21 comes to bear against the planar part 14 of the arm 13 of the caliper 2, and the clearance formed between the body of said screw 15 and the opening 16 permits centring of the pin 21 in the bore 12.

According to a variant shown in FIG. 4, the shoulder 21c of the pin 21 may be in the form of six sides, accommodated in a groove 18 formed on the planar part 14 of the arm 13 of the caliper 2, so as to prevent the rotation of the pin 21 as the screw 15 is tightened. In this case, the opening 16 has the form of an elongated hole.

Moreover, the inner surface of the bore 12 is in contact with the outer surface of the pin 21 only over a small portion limited to the small bearing surface 21a.

It will be understood that, by virtue of this arrangement, the caliper can freely withstand the customary torsions which result in a disalignment with respect to the stationary support upon actuation of the brake motor, thus eliminating the jamming effects and contributing to the braking efficiency.

What we claim is:

1. A disc-brake with a caliper mounted slidably on a stationary support, comprising two friction pads received anchorably and slidably in said stationary support and capable of engaging frictionally with opposite faces of a revolving disc upon actuation of a brake motor, a single large diameter axial column fixed to the stationary support and received slidably in a corresponding bore formed in the caliper such that sliding movement of the caliper is provided continually all along the length of the column and the caliper pivoted only about the column during servicing of the disc brake, and means for locking the caliper in rotation about the column on the stationary support, said locking means being a ball joint type comprising a small multidiameter flexible pin extending axially between a second bore provided in the stationary support and an arm of the caliper, the pin comprising at an end penetrating the second bore of the stationary support a small bearing surface having a part engagable with a surface of the second bore and the small bearing surface having a very small clearance with said second bore so as to permit a functional torsional disalignment of the caliper with respect to the stationary support during actuation of the brake motor, the small bearing surface having a diameter greater than a diameter of a longitudinal stem part of the pin such that the part of the small bearing surface is the only part of the pin engaging the surface of the second bore, the small bearing surface of the pin being located axially at a rear portion of the second bore, an opposite end of the pin fixed to the arm of the caliper, and the longitudinal stem part extending between the small bearing surface and opposite end.

2. The disc-brake according to claim 1, wherein the small bearing surface of the pin is cylindrical.

3. The disc-brake according to claim 1, wherein the small bearing surface of the pin is oval.

4. The disc-brake according to claim 1, wherein the pin comprises, at the opposite end, a shoulder forming a planar stop surface perpendicular to a longitudinal axis of said pin and bearing on a planar part of the arm of the caliper, said stop surface containing a threaded hole cooperating with an immobilized member passing, with clearance, through an opening provided in the arm of the caliper so as to permit centering of said pin during assembly of the brake.

5. The disc-brake according to claim 4, wherein the shoulder is in the form of six sides accommodated in a groove formed at the planar part of the arm of the caliper.

6. The disc-brake according to claim 5, further comprising sealing means surrounding an end of the shoulder of the pin and extending between said shoulder and the stationary support.

* * * * *